UNITED STATES PATENT OFFICE.

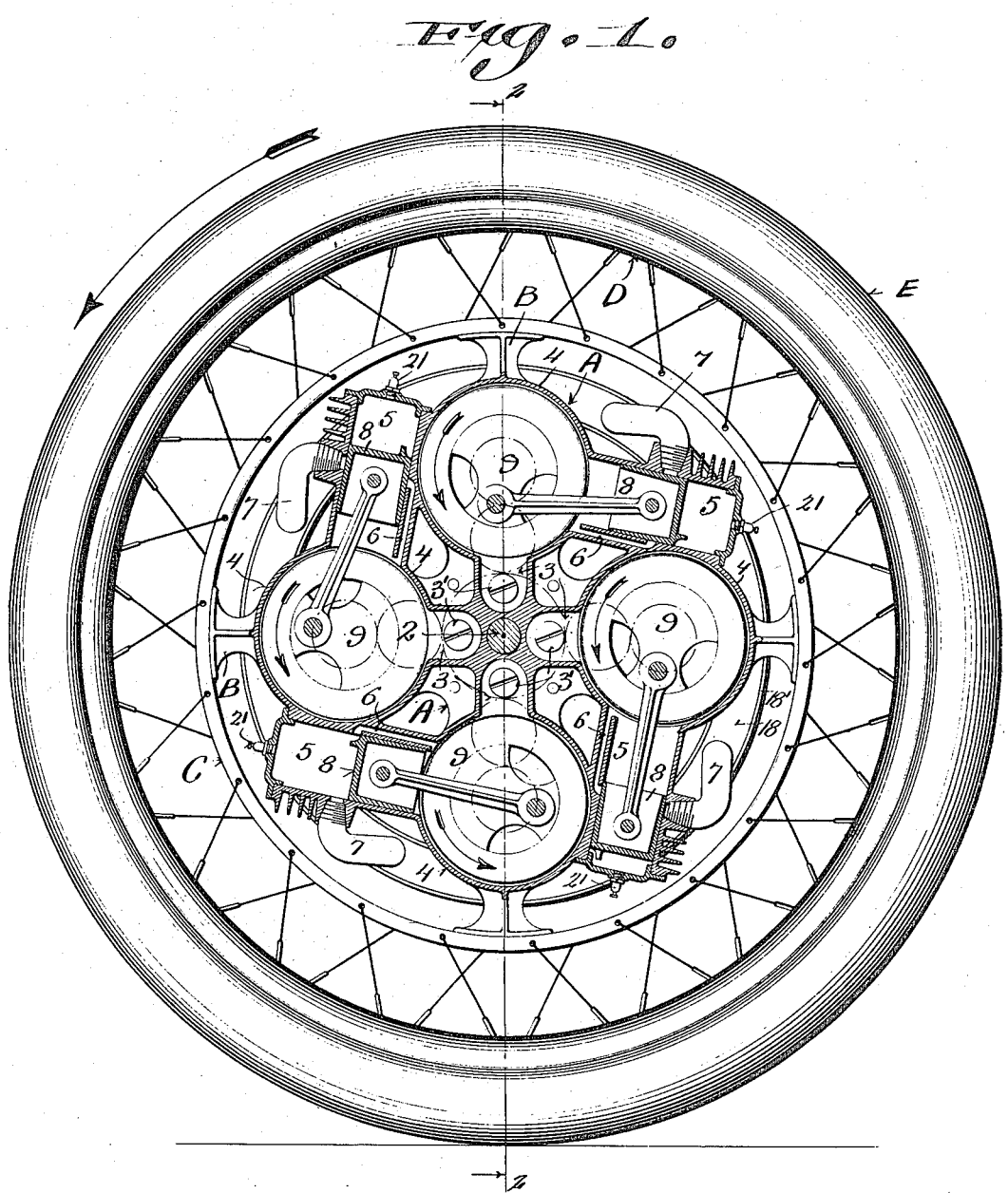

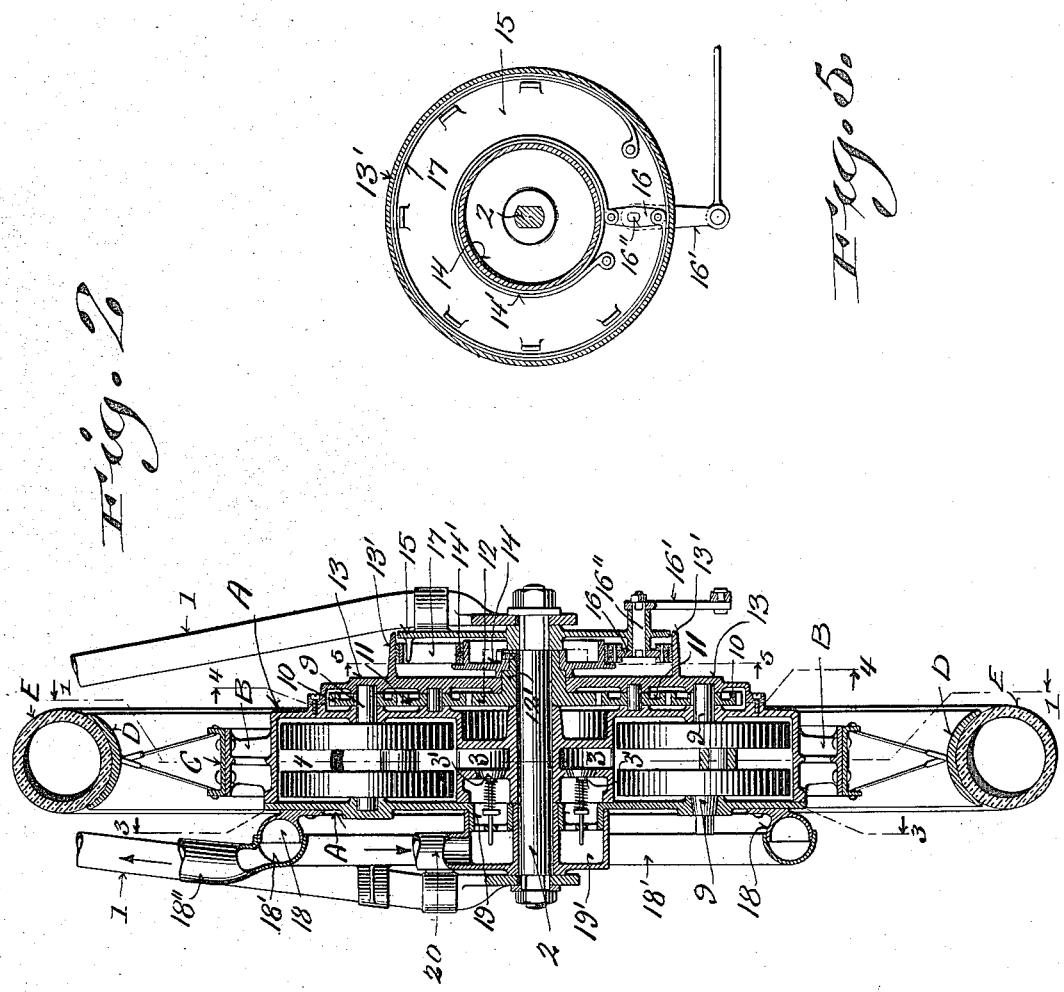

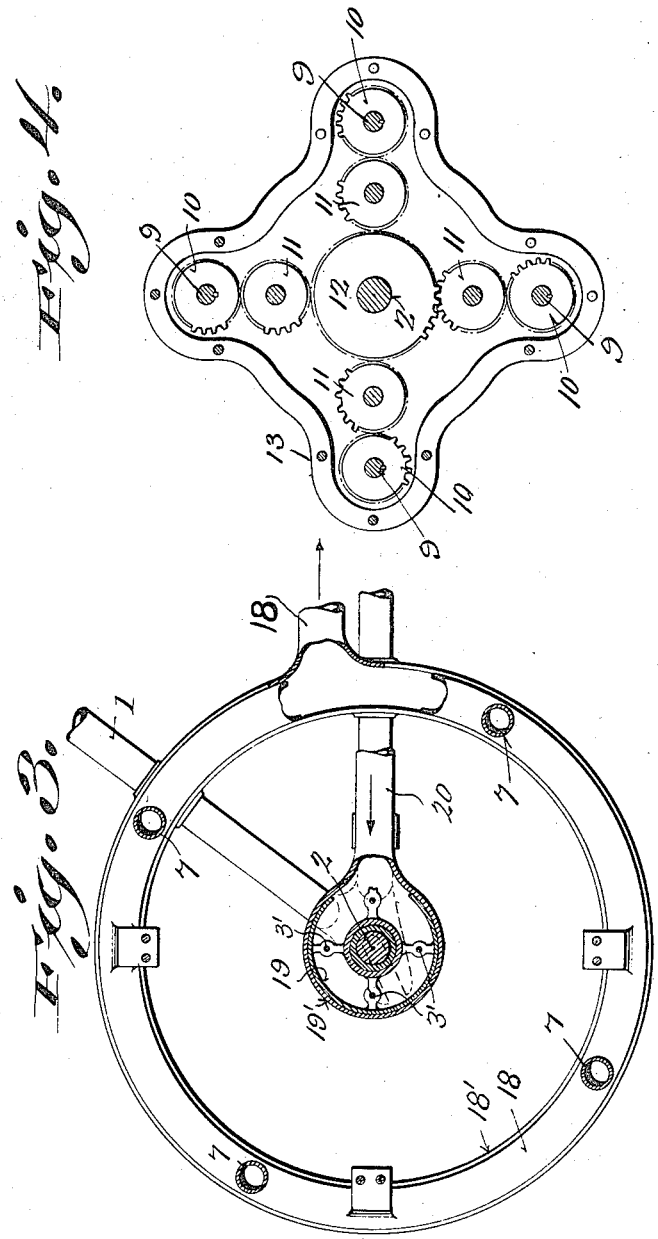

STEPHEN W. NELDNER, OF MILWAUKEE, WISCONSIN, ASSIGNOR, BY DIRECT AND MESNE ASSIGNMENTS, TO NELDNER HUB MOTOR CO., OF MILWAUKEE, WISCONSIN, A CORPORATION OF WISCONSIN.

SELF-PROPELLED ROTOR.

1,176,236.      Specification of Letters Patent.     Patented Mar. 21, 1916.

Application filed September 8, 1914. Serial No. 860,696.

*To all whom it may concern:*

Be it known that I, STEPHEN W. NELDNER, a citizen of the United States, and resident of Milwaukee, in the county of Milwaukee and State of Wisconsin, have invented certain new and useful Improvements in Self-Propelled Rotors; and I do hereby declare that the following is a full, clear, and exact description thereof.

My invention has for its object to provide a simple, economical and effective self propelled rotor, the same primarily comprising a master wheel carrying a series of power units in the form of two cycle gas engines that revolve about a fixed axis, the crank-shafts of which engine units describe a planetary movement relative to the master wheel axle and are in gear connection with a clutch-controlled drive-wheel, whereby the power is transmitted to the master wheel. The engine units are each arranged in communication with a common fuel centrally disposed intake chamber having a valve for each cylinder of the series, the said chamber comprising a fixed member and a rotatory member and each cylinder is also arranged in communication with a two part exhaust ring, one section of which revolves with the main wheel while the other section is fixed.

It is obvious from the foregoing statement of the invention that the master wheel may, as shown in the accompanying illustrations, form the driver or traction wheel of a self-propelled vehicle or it may be utilized in the form of a pulley or crank for transmitting power as the case may require.

With the above objects in view the invention consists in certain peculiarities of construction and combination of parts as set forth hereinafter with reference to the accompanying drawings and subsequently claimed.

In the drawings Figure 1 represents a sectional face view of a master wheel embodying the features of my invention. the section being indicated by line 1—1 of Fig. 2; Fig. 2, a longitudinal sectional view of the wheel, the section being indicated by line 2—2 of Fig. 1; Fig. 3 is a sectional view on the line 3—3 of Fig. 2, showing the inlet and exhaust means; Fig. 4, a detailed sectional view through the clutch-controlled gear mechanism, whereby power is transmitted from the various engine units to the wheel, the section being indicated by line 4—4 of Fig. 2, and Fig. 5, a detailed sectional face view of the clutch mechanism employed in connection with my invention, the section being indicated by line 5—5 of Fig. 2.

Referring by characters to the drawings, 1 represents frame members that are shown in the form of a tubular fork, the said frame members being cross-connected by a fixed axle 2. Mounted upon the axle is a skeleton hub bracket A, which member is secured by legs B to a ring C, the same being connected by wire spokes to a wheel-rim D, which wheel-rim in this exemplification of my invention is adapted to receive a resilient tire tread E. The hub bracket is, as shown, formed with a series of radially disposed fuel supply channels 3 each of which communicates with a crank casing cavity 4, the crank casing cavities being each in communication with a tangentially disposed cylinder 5, the said cylinders at their firing ends being, in turn, in web connection with the crank casing shell of the juxtaposed engine unit, whereby rigidity and strength is added to the skeleton hub bracket.

Each cylinder is provided with an intake duct 6 and an exhaust duct 7 in the form of an elbow pipe section and each cylinder is also provided with the usual piston-head 8 that is in pitman connection with a crank-shaft 9, the said crank-shaft being of the double disk type and journaled in suitable bearings with which the hub bracket is provided. One end of each crank-shaft has secured thereto a gear-wheel 10 preferably of the toothed type, each of which gear-wheels meshes with an intermediate gear-wheel 11, as best shown in Figs. 2 and 4. The intermediate gear-wheels 11 are all in gear connection with a drive-wheel 12, the hub 12' of which drive-wheel is loosely mounted upon the stationary axle 2. A gear casing 13 is fitted over the series of gear-wheels, being secured to the hub bracket in any suitable manner. The hub of the gear-casing is apertured to admit the passage of the drive gear-wheel hub 12' therethrough and the said hub has secured to its outer end a friction wheel 14 for the reception of a band-brake 14'. One end of the band-brake is secured to a disk 15 that is fast on the axle 2 and the opposite end of said band-brake is secured to a toggle arm 16, the other arm of which toggle-arm is secured to a second outer band-brake 17. The opposite end of this band-brake, in turn, is also secured to the disk 15 and the said outer band-brake is adapted to engage a brake-ring 13' that projects from the gear-casing 13. This double band-brake mechanism is actuated by manually controlled crank-arm 16' in the usual manner. The toggle-arm and crank-arm are connected by a stud 16", which stud is journaled in a bearing that is formed in the disk 15.

From the foregoing description it will be observed that the drive-wheel is under clutch control and when the brake mechanism is actuated in one direction said drive-wheel is locked against rotation upon its axis and when the brake mechanism is actuated in the opposite direction this drive-wheel is rendered free to rotate about its axis while the outer band-brake 17 will expand to lock the master wheel against rotation or partially lock the same due to the engagement of said band-wheel with the brake-ring 13'.

As best shown in Fig. 3 of the drawings each of the exhaust ducts 7 from the engine cylinder communicates with a split ring member 18 that is affixed to one face of the hub bracket. This ring section articulates with a fixed ring section 18' that is fast to one of the juxtaposed frame members 1. The fixed ring section, as shown, is provided with an exhaust pipe 18" which discharges from the various cylinders at any convenient point. The fuel supply channels 3 all communicate with an intake chamber, which chamber is cylindrical in form about the wheel axis and is composed of a rotatory section 19 and a fixed section 19' that are in ground joint connection, whereby leakage is eliminated, it being understood that this coupling connections between the revoluble and fixed sections of the intake chamber may be constructed in any manner within the knowledge of skilled mechanics. The fixed section 19' communicates with a fuel supply pipe 20 that is connected to a suitable carbureter and source of fuel supply, whereby the proper mixture of fuel charge is admitted to the various cylinders.

Each fuel supply channel is formed with an aperture that communicates with the common intake chamber and the said apertures are controlled by spring-pressed check-valves 3', which valves prevent the escape of the gases from the crank-case in compression and working strokes of the pistons.

From the foregoing description it is manifest that to start the rotor the master wheel is given an initial movement, the drive-wheel 12 in the starting operation being held against rotation. Hence motion from the drive-wheel through its gear connections is transmitted to the various crank-shafts 9, whereby the piston units will be reciprocated.

In the operation of this engine, each of the pistons 8 on its compression stroke in its cylinder draws a charge of mixture into its respective crank case 9 through the channel 3 and valve 3'. On the return or working stroke of the piston, the valve 3' closes and the charge is compressed in the crank case by the piston until the latter uncovers the duct 6 when the charge rushes into the cylinder and forces out the burned gases through the exhaust pipe 7. The piston then moves outward in the cylinder drawing a new charge behind it into the crank case and compressing the charge in the cylinder until the piston reaches the end of its stroke when the compressed charge is ignited and drives the piston on its working stroke, at the same time compressing the new charge in the crank case 9.

It is understood that the spent charges of gaseous vapor from the various cylinders are exhausted through the exhaust ring connections, as previously described. Should it be desired to stop the master wheel at any time, it is only necessary to manipulate the brake mechanism, whereby the clutch-controlled drive-wheel 12 is freed and thus, even though the engine units be in operation, no movement will be imparted to said master wheel.

It is understood that the supply of fuel to the various engine units is controlled by suitable valve mechanism, not shown, and that each engine unit is provided with a spark-plug 21 of any desired type so timed in connection with a suitable source of electrical energy as to produce the spark within the proper interval of the engine cycle.

While I have shown and described minutely certain details of construction for carrying out my invention, it should be understood that I may vary such details within the scope of skilled mechanics.

I claim:

1. In a self-propelled rotor, the combination of a main wheel, a fixed axle therefor, and a series of internal combustion two cycle engine units revoluble with the master wheel, the crank-shafts of which are positioned equi-distant from the axis of rotation of said wheel, a common fuel intake chamber comprising a revoluble member carried by the main wheel, a fixed member in communication with the revoluble member, a valve-controlled intake channel for each engine unit in communication with the common intake chamber, a two part exhaust ring comprising a section carried by the main wheel and in communication with each of the engine units, a fixed section in rotatory union with the revoluble section, a drive gear-wheel loosely mounted upon the axle, a train of gear-wheels connecting the crank-shaft of each engine unit with the drive-wheel, and a manually controlled clutch mechanism for locking the drive-wheel or releasing the same.

2. In a self-propelled rotor, the combination of a main wheel, a fixed axle therefor, and a series of internal combustion two cycle engine units revoluble with the master wheel, the crank-shafts of which are positioned equi-distant from the axis of rotation of said wheel, a common fuel intake chamber comprising a revoluble member carried by the main wheel, a fixed member in communication with the revoluble member, a valve-controlled intake channel for each engine unit in communication with the common intake chamber, a two part exhaust ring comprising a section carried by the main wheel and in communication with each of the engine units, a fixed section in rotatory union with the revoluble section, a drive gear-wheel loosely mounted upon the axle, a train of gear-wheels connecting the crank-shaft of each engine unit with the drive-wheel, a clutch-wheel carried by the drive-wheel, a clutch-ring carried by the main wheel, and manually controlled band brake mechanism for alternate engagement with the clutch wheel and clutch ring.

3. A self-propelled rotor comprising a main wheel, a fixed axle therefor, a skeleton hub bracket for the main wheel revoluble upon the axle, the same comprising a series of cylinders and connected crank-casings, the crank-casings having valve-controlled intake channels, a section of an intake chamber formed at the hub of the hub-bracket in communication with the intake channels, a fixed section of intake chamber mounted about the axle in rotary union with the first mentioned section, a two-part exhaust ring, one section of which is secured to the hub bracket, the other section being fixed, pipes in connection with the hub bracket ring section and each cylinder unit, crank-shafts revoluble within the crank-casings, a clutch-controlled driving wheel loosely mounted upon the axle, and a gear-connection between the drive-wheel and each crank-shaft.

In testimony that I claim the foregoing I have hereunto set my hand at Milwaukee in the county of Milwaukee and State of Wisconsin in the presence of two witnesses.

STEPHEN W. NELDNER.

Witnesses:
   LUDWIG H. KOTTNAUER,
   MAX J. CZERWINSKI.